UNITED STATES PATENT OFFICE.

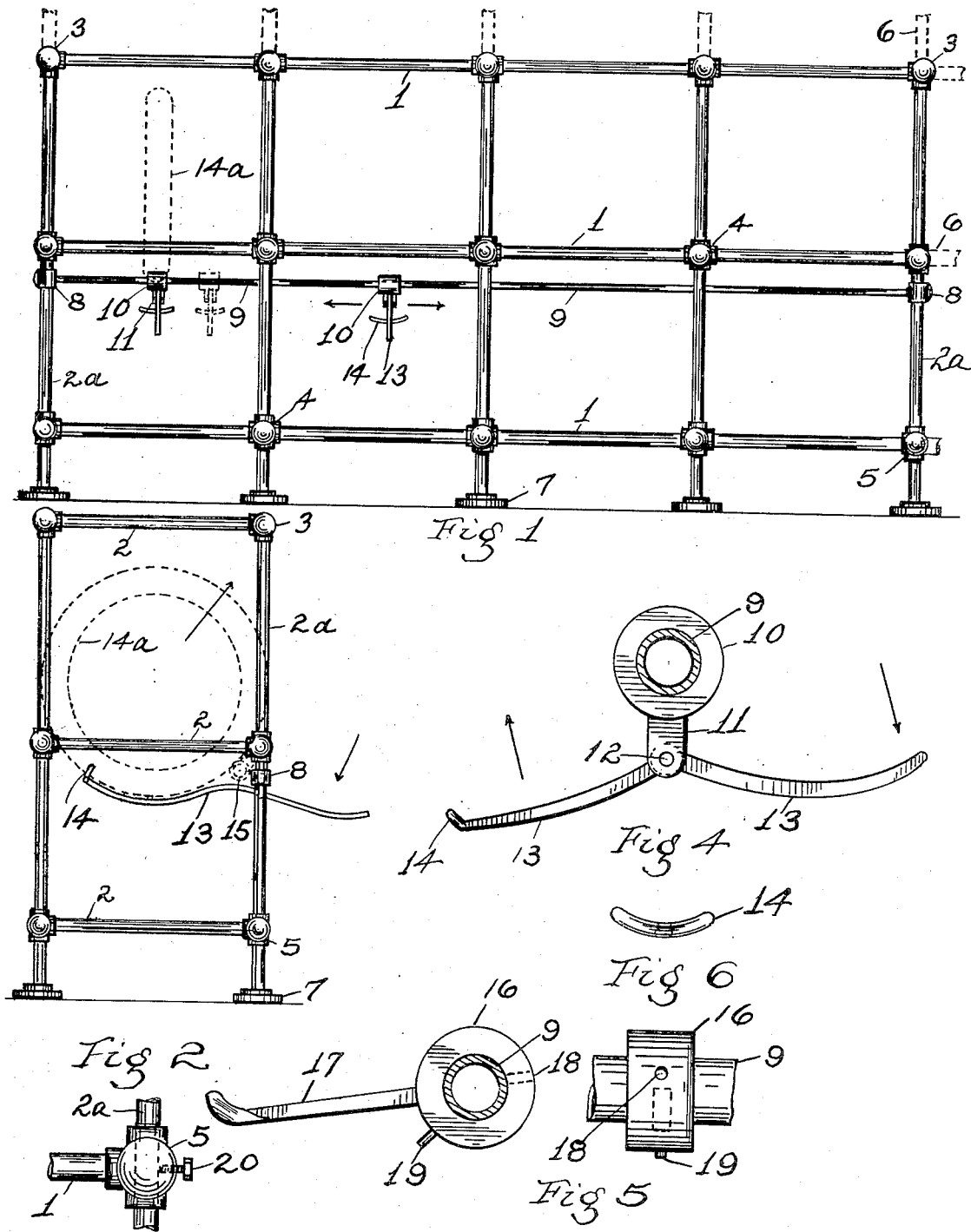

LINWOOD A. WINSLOW, OF NORFOLK, VIRGINIA.

TIRE-RACK.

1,133,598.   Specification of Letters Patent.   Patented Mar. 30, 1915.

Application filed March 12, 1914. Serial No. 824,293.

*To all whom it may concern:*

Be it known that I, LINWOOD A. WINSLOW, a citizen of the United States, residing at Norfolk, in the county of Norfolk and State of Virginia, have invented certain new and useful Improvements in Tire-Racks, of which the following is a specification.

My invention relates to racks or stands for automobile tires and the like.

The object of the invention is to provide a stand or rack for holding tires which may be easily taken down and set up, also to provide means whereby the difficulty of removing heavy tires from the rack may be eliminated.

Further objects and advantages will be more fully described herein and specifically pointed out in the annexed claims recourse being had to the accompanying drawing forming a part of this specification in which—

Figure 1 is a front view of the rack or stand. Fig. 2 is an end view of the same. Fig. 3 is a fragmentary portion of the rack members and one connection or fitting showing a set screw for adjustment. Fig. 4 is a cross section through the slideway pipe or rod and a side elevation of the sliding sleeve, coupling or carrier. Fig. 5 is a side elevation and a front view of a modified form of the carrier shown in Fig. 4, and Fig. 6 is a front view of the curved end of the tire lifting arm or lever.

In the drawing like reference numerals indicate similar parts in all the several views.

1, 2 and 2ª are sections of pipe or metal tubing forming the length, height and breadth members, respectively, of the stand or rack. The pipe or tubing is suitably joined by the corner railing fittings 3, the side outlet crosses 4, and the side outlet Ts 5, as shown. The pipe is threaded and screwed into the fittings and may be extended to any size at will, as indicated by the dotted lines 6 in Fig. 1.

In order to take down the rack easily and quickly I cut a longer thread on one end of the pipe than on the other and in this manner I can unscrew one end by screwing it into another member until the pipe is withdrawn from a connecting section and may be removed. The rack or stand is provided with foot flanges 7 so that it may be screwed to the floor, if desired.

8 are fittings placed at a certain short distance below the tire bearing pipe sections, (see dotted lines 14ª, in Figs. 1 and 2), and is for the purpose of supporting the slideway rod or pipe 9 which extends along the length of the rack and between the upright pipe members 2ª.

10 are sleeves, couplings or carriers slidably mounted on the pipe or rod 9 and is provided with ears or depending lugs 11, and a pin 12 for the tire ejecting handle 13 which is pivoted upon the latter, as shown.

14 is a curved end placed at right angles to the lever or handle 13 forming a T shaped or bifurcated end, as shown in Figs. 2, 4 and 6.

14ª are dotted lines representing a tire in place upon the rack.

15, (Fig. 2), shown by dotted lines, indicates the position for the arrangement of the slideway member when it is desired to have the pipe or rod 9 inside of the frame of the rack so that the sliding sleeves or carriers may traverse the entire length of the rack, in which case the sliding sleeve or carrier 16 is used, 17 being the tire lifting arm, 18 a hole for inserting a rod for turning the sleeve, and 19 a stop pin or lug for preventing the arm 17 from falling too low and engages some fixed point on the rack members. 20 is a set screw in the fittings by which the apparatus may be adjusted, as desired, by slidably mounting the fittings upon the vertical or horizontal pipes forming the rack.

By a downward pressure upon the outer end of the lever 13, the tire is thrown upward and outward, as indicated by the upper arrow in Fig. 1 so that a tire may be removed from between other tires quickly and easily.

When the tires are in the rack, especially those in the upper tier, are difficult to remove and by my device, the labor required to dislodge tires from the rack is much reduced.

I claim:

1. A tire rack comprising vertical and horizontal pipe members having railing pipe fittings, and means for ejecting a tire upward and from said rack.

2. A tire rack or stand composed of piping, and slidable means along the length of the rack for removing a single tire from a collection of abutting tires.

3. A tire rack having adjustable pipe or tube members, a slidable member or carrier therefor, and an arm or lever carried by said slidable member for lifting a tire upward and forward from said rack.

4. The combination of a tire rack or holder, of a tire removing device consisting of a slidable sleeve and a T shaped curve ended rockable lever.

5. A tire rack or stand, having a slidably mounted bifurcated lever for lifting and ejecting a tire from the rack, and stop pin means for said lever.

In testimony whereof I have hereunto affixed my signature in the presence of two witnesses.

LINWOOD A. WINSLOW.

Witnesses:
 HERMAN G. SMITH,
 WALTER B. BURROWS.